G. H. FRITZSCHE.
AUTO RADIATOR HEATER.
APPLICATION FILED JUNE 5, 1919.

1,377,621.

Patented May 10, 1921.

Inventor:
George H. Fritzsche
by attorneys
Brown & Seward

UNITED STATES PATENT OFFICE.

GEORGE H. FRITZSCHE, OF BROOKLYN, NEW YORK, ASSIGNOR TO TAPLEX CORPORATION, OF BROOKLYN, NEW YORK, A CORPORATION OF NEW YORK.

AUTO-RADIATOR HEATER.

1,377,621. Specification of Letters Patent. Patented May 10, 1921.

Application filed June 5, 1919. Serial No. 301,921.

*To all whom it may concern:*

Be it known that I, GEORGE H. FRITZSCHE, a citizen of Germany, and resident of the borough of Brooklyn, in the city and State of New York, have invented a new and useful Improvement in Auto-Radiator Heaters, of which the following is a specification.

This invention relates to improvements in automobile radiator heaters and has for its object to provide a device for heating the contents of a radiator of an automobile and keeping the same at an efficient working temperature for a considerable length of time.

A further object is to provide a device which may be readily attached to or detached from the radiator of an automobile if so desired.

A still further object is to provide certain improvements in the form, construction and arrangement of the device whereby the above mentioned objects and other features of advantage may be effectively attained.

A practical embodiment of my invention is represented in the accompanying drawings in which, Figure 1 represents a front elevation of a radiator of an automobile having my improved heater attached thereto.

Figure 1:
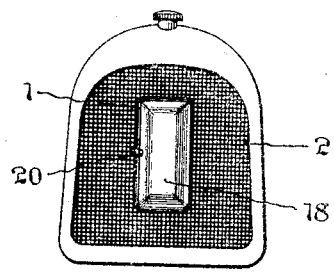
Figure 2:
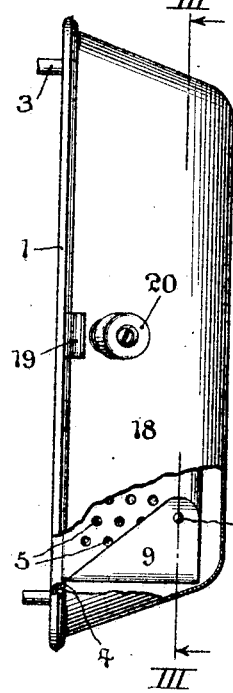
Fig. 2 represents a side elevation of the device, on an enlarged scale, certain portions being broken away to show parts within.
Figure 3:
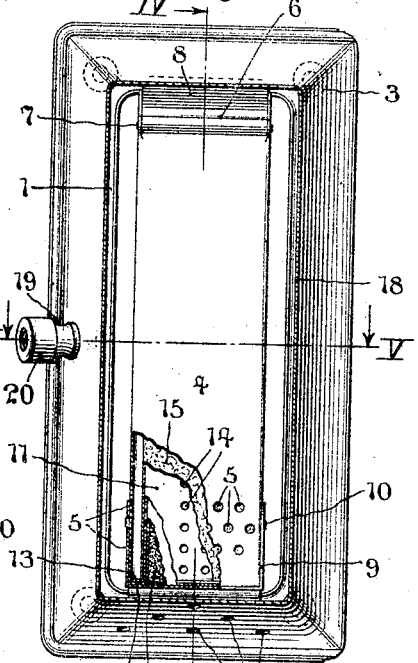
Fig. 3 represents a vertical section taken in the plane of the line III—III of Fig. 2, looking in the direction of the arrows.
Figure 4:
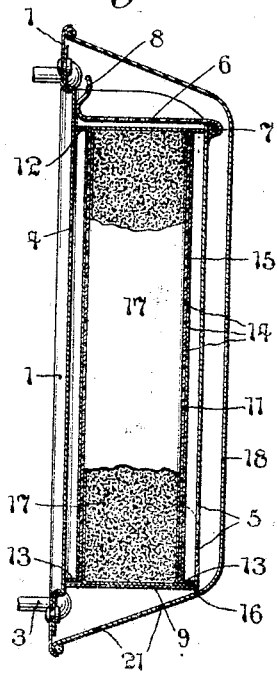
Fig. 4 represents a vertical section taken in the plane of the line IV—IV of Fig. 3, looking in the direction of the arrows.
Figure 5:
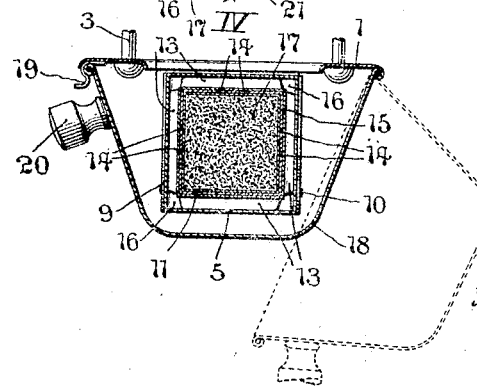
Fig. 5 represents a horizontal section taken in the plane of the line V—V of Fig. 3, looking in the direction of the arrows.

The frame of the device denoted by 1 is of skeleton construction and arranged to be removably or permanently secured to a radiator 2 of an automobile by means of bolts 3. A vertically disposed casing 4 of tubular form, and open at each end, is permanently fixed to the top and bottom of the frame 1, and has a series of holes 5 near its lower end to admit air therethrough. The top of the casing 4 is provided with a perforated cover 6 hinged at 7, which cover has a lip 8 for manipulating it. The casing is also provided with a movable bottom 9 which is hinged at 10 and arranged to swing downwardly to discharge any accumulation of matter collected within the casing.

A dry fuel holder 11 is located within the casing 4 and spaced therefrom by outwardly extending flanges 12, 13 at the top and bottom of the holder. The walls of the holder 11 have a series of perforations 14 which are covered by a jacket 15 of porous material, such for instance, as asbestos paper. The holder 11 is supported within the casing by the flanges 13, which rest upon inwardly turned end 16 of the casing 4.

The dry fuel 17 is placed in the holder through the cover of the casing and when in position rests upon the bottom 9.

A door 18 is hinged at one side of the frame 1 and is held closed by a spring actuated clip 19 carried by the frame 1. A handle 20 is arranged at the side of the door for convenience in opening or closing it. The door also has a series of perforations 21 near the bottom thereof to admit air therethrough.

In the operation of the device, the fuel after being ignited will continue to burn for several hours and will create heat which will pass from the device through the frame to the radiator. The heat generated is sufficient to keep the contents of the radiator at an efficient working temperature in the coldest weather.

After the fuel has been consumed, the ashes therefrom may be discharged by swinging the bottom 9 downwardly. When the bottom has been returned to its closed position and the perforated cover 6 swung outwardly from the top of the casing, the holder 11 may be replenished with a stick of fuel.

It will be understood that various changes may be resorted to in the form, construction, and arrangement of the several parts, without departing from the spirit and scope of my invention; and hence I do not intend to be limited to the specific details herein shown and described except as they may be included in the claims.

What I claim is:—

1. A heater for automobile radiators comprising, a frame arranged to be mounted on the front of the radiator and having an opening therethrough, a vertically disposed tubular casing secured to the top and bottom of said frame in open communication with the radiator through the opening in the frame, a dry fuel holder vertically disposed in said casing, and a door extended laterally to form a housing around the casing, said door being hinged to the frame and arranged to contact therewith to protect the casing.

2. A heater for automobile radiators comprising, a frame arranged to be mounted on the front of the radiator and having an opening therethrough, a perforated vertically disposed tubular casing secured to the top and bottom of said frame in open communication with the radiator through the opening in the frame, a dry fuel holder vertically disposed in said casing, and a door extended laterally to form a housing around the casing, said door being hinged to the frame and arranged to contact therewith to protect the casing.

3. A heater for automobile radiators comprising, a frame arranged to be mounted on the front of the radiator and having an opening therethrough, a vertically disposed tubular casing secured to the top and bottom of said frame in open communication with the radiator through the opening in the frame, said casing having a movable bottom, a dry fuel holder vertically disposed in said casing, and a door extended laterally to form a housing around the casing, said door being hinged to the frame and arranged to contact therewith to protect the casing.

4. A heater for automobile radiators comprising a frame, an open ended vertically disposed tubular casing secured to said frame, said casing having a movable cover and a movable bottom, a dry fuel holder located in the casing, and a door hinged to the frame for housing and protecting the casing.

5. A heater for automobile radiators comprising a frame, an open ended vertically disposed tubular casing secured to said frame, said casing having a perforated movable cover and a movable bottom, a dry fuel holder located in the casing and spaced therefrom, and a door having perforations therein and hinged to the frame for housing and protecting the casing.

In testimony, that I claim the foregoing as my invention, I have signed my name this 28th day of April, 1919.

GEORGE H. FRITZSCHE.